United States Patent [19]

Kodaira et al.

[11] Patent Number: 5,310,821
[45] Date of Patent: May 10, 1994

[54] POLYPHENYLENE ETHER RESIN COMPOSITIONS

[75] Inventors: Tetsuji Kodaira; Hiromi Ishida; Hidekazu Kabaya, all of Moka City, Japan

[73] Assignee: GE Plastics Japan, Ltd., Tokyo, Japan

[21] Appl. No.: 989,263

[22] Filed: Dec. 11, 1992

[51] Int. Cl.$^5$ .................. C08L 71/12; C08L 77/06
[52] U.S. Cl. ..................... 525/397; 525/905
[58] Field of Search .................. 525/397, 905

[56] References Cited

U.S. PATENT DOCUMENTS

| | | | |
|---|---|---|---|
| 4,873,276 | 10/1989 | Fujii et al. | 525/397 |
| 5,081,185 | 1/1992 | Haaf et al. | 525/390 |
| 5,147,942 | 9/1992 | Abe et al. | 525/397 |
| 5,159,018 | 10/1992 | Nishio et al. | 525/397 |

Primary Examiner—James J. Seidleck
Assistant Examiner—Thomas Hamilton, III

[57] ABSTRACT

A resin composition is provided which contains (A) 5-80 weight parts polyphenylene ether resins and (B) 20-90 weight parts polyamide resins, wherein the (B) polyamide resins: (a) comprise 1-50 weight percent of polyamide resins having a number-average molecular weight not greater than 11,000, and a terminal amino group content of at least $7.0 \times 10^{-5}$ mole/g, and (b) have an overall number-average molecular weight of 9,500 to 32,000, and a terminal amino group content of $5.5 \times 10^{-5}$ mole/g or less. The resin compositions have both good impact resistance (in particular at low temperatures) and good melt flow. The resin compositions can be used in a wide range of applications, and so are industrially useful.

11 Claims, No Drawings

POLYPHENYLENE ETHER RESIN COMPOSITIONS

DETAILED EXPLANATION OF INVENTION

The present invention relates to polyphenylene ether (hereinafter referred to as "PPE") resin compositions. In particular, it relates to PPE/polyamide resin compositions having a good combination of impact resistance and melt flow.

PPEs are useful resins for molding materials because of their excellent mechanical and electrical properties. However, their oil resistance is unsatisfactory. It is known that in order to improve them in this respect, PPEs can be mixed with polyamides having good oil resistance (e.g., Japanese Early Patent Disclosure Publication No. 56-16525). But because the compatibility of PPEs with polyamides is poor, molded products made from mixed PPE/polyamide resin compositions do not exhibit the good mechanical or other properties of the two resins. Their impact resistance in particular is poor.

To help overcome this problem, unsaturated carboxylic acids such as maleic acid or derivatives thereof have been added as compatibilizers to resin compositions of PPEs and polyamides in an attempt to improve their impact resistance while obtaining better oil resistance (Japanese Early Patent Disclosure Publication No. 56-26913).

Also known in the addition of saturated aliphatic polycarboxylic acids as compatibilizers (Japanese Patent Publication No. 61-502195).

Improvement of compatibility by adjusting the terminal amino group content of the polyamide so that it is greater than the terminal carboxyl group content is disclosed in Japanese Early Patent Disclosure Publication No. 63-10655 and Japanese Patent Application No. 1-115172.

Nevertheless, when these compatibilizers are used, or when polyamides having their terminal amino group content adjusted as described above are used, there arises the problem that the melt flow of the compositions is lowered, resulting in poorer forming processability.

The present invention thus has as its object to provide resin compositions containing polyphenylene ethers and polyamides which have both good impact resistance—in particular at low temperatures—and good melt flow.

As the result of intensive research by the present inventors on the compatibilization of PPEs with polyamides, it has been found that by using a combination of polyamides having low molecular weight and high terminal amino group content, with polyamides having high molecular weight and low amino group content, it is possible to provide PPE/polyamide resin compositions having both good impact resistance and good melt flow. That discovery has led to the present invention.

Thus, PPE resin compositions in accordance with the present invention contain (A) 5–80 wt. parts polyphenylene ether resins and
(B) 20–95 wt. parts polyamide resins, and are characterized in that the (B) polyamide resins:
(a) include 1–50% (based on total polyamide resins) polyamide resins having a number-average molecular weight not greater than 11,000 and a terminal amino group content of at least $7.0 \times 10^{-5}$ mole/g, and
(b) have an overall number-average molecular weight of 9,500 to 32,000, and terminal amino group content of $6.0 \times 10^{-5}$ mole/g or less.

The PPE resins used in the present invention may be known polymers such as those represented by the general formula:

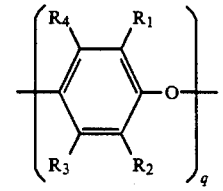

(where $R_1$, $R_2$, $R_3$, and $R_4$ are each independently a hydrogen atom, halogen atom, alkyl group, alkoxy group, or monovalent substituent group selected from haloalkyl and haloalkoxy groups having at least two carbon atoms between the halogen atom and the phenyl ring and having no tertiary α-carbon atoms; and q is an integer representing the degree of polymerization). They may be polymers consisting of just one type, or copolymers of two or more types of units represented by the above general formula. In preferred examples, $R_1$ and $R_2$ are alkyl groups having 1–4 carbon atoms, while $R_3$ and $R_4$ are hydrogen atoms or alkyl groups having 1–4 carbon atoms. Examples of such polymers include poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, etc. Examples of PPE copolymers include those having the above types of polyphenylene ether repeating units and also some repeating units formed from trialkyl phenols, such as 2,3,6-trimethylphenol. The PPEs may also be copolymers having styrenic compounds grafted onto them. Examples of such styrenic compound-grafted polyphenylene ethers include those obtained by graft polymerization of PPEs with styrenic compounds such as styrene, α-methylstyrene, vinyltoluene, chlorostyrene, etc.

The polyamide resins used in the present invention may be, for example, nylon-4, nylon-6, nylon-6,6, nylon-12, nylon-6,10, although they are not limited to these. The essential things in the present invention are first of all that (a) the polyamide resins include 1–50 wt %, preferably 3–20 wt % (based on total polyamides) polyamide resins having a number-average molecular weight not greater than 11,000, preferably 8,000–11,000, and a terminal amino group content of at least $7.0 \times 10^{-5}$ mole/g, preferably at least $10 \times 10^{-5}$ mole/g. If the composition does not contain this sort of polyamide resin, the effect of the present invention will not be realized. That is, one cannot obtain PPE/polyamide resin compositions having a combination of good impact resistance and flow.

The second essential condition is that the polyamide resins used have an overall number-average molecular weight of 9,500 14 32,000, preferably 11,000–25,000, and a terminal amino group content of $6.0 \times 10^{-5}$ mole/g or less, preferably $5.5 \times 10^{-5}$ mole/g or less. If the overall number-average molecular weight of the polyamide resins is below this range, the impact strength of the composition will be low, whereas if it is above this range, the melt flow of the composition will be low. If the terminal amino group content of the polyamide resins overall is greater than that specified above, the impact resistance of the composition will be high but its melt flow will be low.

the number-average molecular weight of the polyamide in the present invention has been calculated using a conversion formula from the relative viscosity obtained according to JIS K 6810-1977 from viscosity measurements in polymer solutions in 98% sulfuric acid at 25° C.

Adjustment of the terminal amino group content of the polyamide can be accomplished by varying the amount of diamines or other compounds having groups which react with carboxyl groups during polymerization of the polyamide. The amount of compounds having groups which react with carboxyl groups can also be adjusted after polymerization of the polyamide.

The terminal amino group content of the polyamide was measured as follows. A sample of the polyamide resin was dissolved in m-cresol under nitrogen at 80° C., then an indicator solution of Thymol Blue in methanol was added, and the solution was titrated with p-toluenesulfonic acid.

The mixing ratio of the PPE component (A) and the polyamide component (B) is 5–80 wt. parts (A) to 95–20 wt. parts (B), preferably 20–70 wt. parts (A) to 80–30 wt. parts (B).

For better compatibilization of the PPE with the polyamide, part or all of the PPE in the present invention may be replaced by a modified PPE having terminal groups capable of reacting with amino groups, such as epoxy groups, carboxyl groups, acid anhydride groups, etc. The PPE terminal groups may be converted to epoxy, carboxyl, or acid anhydride groups by known methods.

Epoxidation of the terminal groups is described, for example, in Japanese Early Patent Disclosure Publication No. 63-125525. Epoxy-terminated PPEs can be obtained by heating and contacting PPEs with substances containing epoxy groups. The epoxy group-containing compounds are preferably epoxy compounds having a terminal halogen group, or epoxy compounds having epoxy groups at both ends. Specific examples of preferred compounds having an epoxy group at one end include epichlorohydrin, 2-methylepichlorohydrin, etc., while preferred examples of compounds having epoxy groups at both ends include 2,2-bis(4-glycidylphenyl ether)propane, epoxy resins, etc. From the standpoint of preventing block formation between pairs of PPEs, compounds having a single terminal epoxy group are particularly preferred.

Carboxy- or acid anhydride-terminated PPEs can be obtained by the reaction of PPEs with carboxyl- or acid anhydride-containing acid chlorides, e.g. trimellitic anhydride chloride, as described, for example, in Japanese Patent Publication No. 62-500456.

In the preparation of such modified PPEs, not all of the terminal groups have to be modified. In preferred examples, the PPE component (A) may contain up to 70 wt % unmodified terminal groups.

The compatibility of the PPEs and polyamides in resin compositions in accordance with the present invention may be further improved by the addition of compatibilizing agents, such as the unsaturated carboxylic acids or derivatives thereof described in Japanese Early Patent Disclosure Publication No. 56-26913, or the saturated aliphatic polycarboxylic acids or derivatives thereof described in Japanese Patent Publication No. 61-502195.

The unsaturated carboxylic acids or derivatives thereof are compounds having (a) carbon-carbon double or triple bonds, and (b) carboxylic acid groups, acid anhydride groups, amide groups, imide groups, carboxylate ester groups, or epoxy groups. Examples of such compounds include maleic anhydride, maleic acid, fumaric acid, maleimide, maleic acid hydrazide, maleic anhydride-diamine reaction products such as those represented by the formulas:

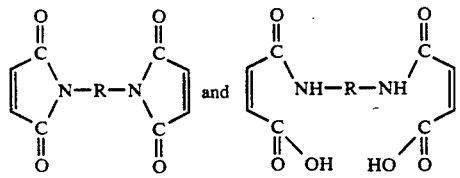

(where R is an aliphatic or aromatic group), methylnadic anhydride, dichloromaleic anhydride, maleamide, soybean oil, tung oil, castor oil, linseed oil, hempseed oil, cottonseed oil, sesame oil, other vegetable oils, peanut oil, camellia oil, olive oil, palm oil, fish oil, or other natural oils, epoxidized soybean oil or other epoxidized natural oils, acrylic acid, butenoic acid, crotonic acid, vinylacetic acid, methacrylic acid, pentenoic acid, angelic acid, tibric acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, erushic acid, docosadienoic acid, docosatrienoic acid, docosatetraenoic acid, docosapentaenoic acid, tetracosenoic acid, hexacosenoic acid, hexacodienoic acid, octacosenoic acid, traakontenic acid, and other unsaturated carboxylic acids, as well as esters, amides, and anhydrides of such unsaturated carboxylic acids, adducts of maleic anhydride or phenols with oligomers (e.g., with average molecular weights of 500 to around 10,000) or high polymers (e.g., with average molecular weights over 10,000) of butadiene, isoprene, etc., and such oligomers or high polymers which have been modified to introduce carboxylic acid groups, epoxy groups, etc.

The saturated aliphatic polycarboxylic acids and their derivatives mentioned above are compounds represented by the following formula:

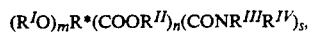

in which:
R* is a linear or branched saturated aliphatic hydrocarbyl group having 2–20 carbon atoms, preferably 2–10 carbon atoms, $R^I$ is a hydrogen atom or an alkyl group, aryl group, acyl group, or carbonyldioxy group (having 1-10, preferably 1-6, more preferably 1-4 carbon atoms), most preferably a hydrogen atom, $R^{II}$ is a hydrogen atom or an alkyl or aryl group (having 1-20, preferably 1-10 carbon atoms), $R^{III}$ and $R^{IV}$ are hydrogen atoms or alkyl or aryl groups (having 1-10, preferably 1-6, more preferably 1-4 carbon atoms), $m=1$, $n+s \geq 2$, preferably $n+s=2$ or 3, $n \geq 0$, $s \geq 0$, ($R^IO$) is in an $\alpha$ or $\beta$ position with respect to a carbonyl group, and at least two of the carbonyl groups are separated by 2-6 carbon atoms.

Derivatives of saturated aliphatic polycarboxylic acids may include their esters, amides, anhydrides, hydrates, salts, etc.

Examples of saturated aliphatic polycarboxylic acids include citric acid, malic acid, agaricic acid, etc. Examples of their esters include citric acid acetyl ester, mono- and distearyl citrates, etc. Examples of their amides include citric acid N,N'-diethylamide, N,N'-dipropylamide, N-phenylamide, N-dodecylamide, and N,N'-didodecylamide, malic acid N-dodecylamide, etc. Examples of their salts include potassium salts, calcium salts, etc.

Compatibilizers of the types described above may be used singly or in combinations of two or more.

To further enhance the impact strength of compositions in accordance with the present invention, they may also include, as optional components, elastomeric substances, e.g., in amounts of up to 80 wt parts per 100 wt. parts of components (A) and (B) combined.

Such elastomeric substances are natural or synthetic polymers that are elastomers at room temperature. Examples include natural rubber, butadiene polymers, styrene-isoprene copolymers, butadiene-styrene copolymers (random copolymers, block copolymers, graft copolymers, etc.), isoprene polymers, chlorobutadiene polymers, butadiene-acrylonitrile copolymers, isobutylene polymers, isobutylene-butadiene copolymers, isobutylene-isoprene copolymers, acrylate ester polymers, ethylene-propylene copolymers, ethylene-propylene-diene copolymers, Thiokol rubbers, polysulfide rubbers, polyurethane rubbers, polyether rubbers (e.g., polypropylene oxide, etc.), epichlorohydrin rubber, etc.

These elastomeric substances may be produced by whatever polymerization process (e.g., emulsion polymerization, solution polymerization), using any catalyst (e.g., peroxides, trialkyl aluminum, lithium halides, nickel-based catalysts). They may have varying degrees of crosslinking, and various proportions of different microstructures (e.g., cis-structures, transstructures, and vinyl groups, etc.). and varying average rubber particle sizes. The copolymers may be random copolymers, block copolymers, graft copolymers, etc. They may also be copolymers with other monomers, such as other olefins, dienes, aromatic vinyl compounds, acrylic acid, acrylate esters, methacrylate esters, etc., present during the production process. The copolymerization process may have been random copolymerization, block copolymerization, graft copolymerization, etc. Examples of such monomers include ethylene, propylene, styrene, chlorostyrene, α-methylstyrene, butadiene, isobutylene, chlorobutadiene, butene, isobutylene, methyl acrylate, acrylic acid, ethyl acrylate, butyl acrylate, methyl methacrylate, acrylonitrile, etc. It is also possible to use partially modifies elastomeric substances, such as hydroxy- or carboxy-terminated polybutadiene, partially hydrogenated styrene-butadiene block copolymers, partially hydrogenated styrene-isoprene block copolymers, etc.

Depending on the intended application, common additives such as pigments, dyes, reinforcing agents (glass fibers, carbon fibers, etc.) fillers (carbon black, silica, titanium oxide, etc.), heat stabilizers, antioxidants, weatherproofing agents, lubricants, mold release agents, crystal nucleating agents, plasticizers, flame retardants, flow promoters, antistatic agents, etc. may also be added during mixing of the resins or during molding, so long as they do not impair the properties of the resin composition.

There is no particular restriction on the process used to produce resin compositions in accordance with the present invention. The usual methods can be satisfactorily employed, although in general melt mixing techniques are preferred. It is possible to use a small amount of solvent, but that is generally not necessary. The equipment used may be, for example, an extruder, a Banbury mixer, a roller, a kneader, etc., which may operate either batchwise or continuously. There is no restriction on the order of mixing of the various components.

EXAMPLES

The present invention will now be described in greater detail by means of some examples, although it is by no means limited to these examples.

The following compounds were used in the examples.

PPE: Poly (2,6-dimethyl-1,4-phenylene) ether, having intrinsic viscosity (in chloroform at 25° C.) 0.48 dL/g Polyamides:

PA-1: Nylon -6 having relative viscosity 2.6 (number-average molecular weight 12,700), and terminal amino group content $7.0 \times 10^{-5}$ mole/g PA-2: Nylon-6 having relative viscosity 2.6 (number-average molecular weight 12,700), and terminal amino group content $4.3 \times 10^{-5}$ mole/g PA-3; Nylon-6 having relative viscosity 2.3 (number-average molecular weight 10,400), and terminal amino group content $11.0 \times 10^{-5}$ mole/g PA-4: Nylon-6 having relative viscosity 2.6 (number-average molecular weight 12,700), and terminal amino group content $3.0 \times 10^{-5}$ mole/g Optional Components:

SEBS: Kraton KG 1651 (trade name, from Shell Chemical, Ltd., hydrogenated styrene-ethylene-butadiene-styrene copolymer)

Citric Acid

EXAMPLES 1-3. COMPARISONS 1-2

A mixture of the amounts (wt. parts) of the various components listed in the table were fed to a vacuum-vented twin-screw extruder and extruded at 290° C. to form pellets. The pellets were fed to an injection-molding machine set at cylinder temperature 280° C., injection pressure 80 kg/cm², and mold temperature 60° C., to produce 5 cm×5 cm×0.3 cm test specimens.

The overall terminal amino group contents of the polyamide resins in the examples and comparisons were as follows.

|  | Example | | | Comparison | |
| --- | --- | --- | --- | --- | --- |
|  | 1 | 2 | 3 | 1 | 2 |
| Terminal Amino Group Content ($\times 10^{-5}$ mole/g) | 5.0 | 3.9 | 4.8 | 7.0 | 4.3 |

Test specimens prepared as described above were subjected to an impact resistance test (high-speed impact test) at low temperature ($-30°$ C.). The test was performed by punching the specimens at a fixed velocity of 5 ml/sec. In each test, 10 specimens were punched, and their fracture mode was observed. The fracture energy was also measured. The notched Izod impact strength (at 23° C. and $-20°$ C.) and the melt index (MI) were also measured.

The Izod impact strength was measured by the ASTM D 256 standard method, while the MI was measured by the ASTM D 1238 standard method. The results are listed in the table.

TABLE

|  | Example | | | Comparison | |
| --- | --- | --- | --- | --- | --- |
|  | 1 | 2 | 3 | 1 | 2 |
| Component (wt. parts) | | | | | |
| PPE | 40 | 40 | 40 | 40 | 40 |
| PA-1 | | | | 45 | |
| PA-2 | | 40 | | | 45 |
| PA-3 | 5 | 5 | 10 | | |
| PA-4 | 40 | | 35 | | |
| SEBS | 15 | 15 | 15 | 15 | 15 |
| Citric Acid | 1 | 1 | 1 | 1 | 1 |
| Notched Izod Impact Strength (kg · cm/cm) | | | | | |
| 23° C. | 84 | 84 | 84 | 82 | 85 |
| $-20°$ C. | 58 | 56 | 55 | 58 | 25 |
| High-Speed Impact Test ($-30°$ C.) | | | | | |
| Failure Mode | ductile | ductile | ductile | ductile | brittle |
| Energy Absorbed (kg · cm) | 510 | 490 | 510 | 530 | 250 |
| MI (280° C., 5 kg/cm$^2$) (g/10 min) | 20 | 30 | 25 | 5 | 25 |

As can be seen from the table, in Comparison 1 the polyamide resin used had a terminal amino group content above the range specified for the present invention, while in Comparison 2 a single polyamide resin whose number-average molecular weight and terminal amino group content were both within the ranges specified for the invention was used. In Comparison 1, which included the polyamide with high terminal amino group content, the low-temperature impact resistance was high, but the melt index was low, indicating poor melt flow. On the other hand, in Comparison 2, where the terminal amino group content was relatively low, the low-temperature impact resistance was poor, but the melt index was high, indicating good melt flow.

On the other hand, in each of the Examples, the impact resistance was high and the melt flow was also good.

Resin compositions in accordance with the present invention are PPE/polyamide resin compositions having a combination of good impact resistance and melt flow. Consequently, they can be used in a wide range of applications, and so are industrially useful.

We claim:

1. A resin composition comprising:
    (A) 5-80 wt. parts polyphenylene ether resins and
    (B) 20-95 wt. parts polyamide resins,
    wherein the (B) polyamide resins:
        (a) comprise 1-50 wt. %, of polyamide resins having a number-average molecular weight not greater than 11,000, and a terminal amino group content of at least $7.0 \times 10^{-5}$ mole/g, and
        (b) have an overall number-average molecular weight of 9,500 to 32,000, and a terminal amino group content of $5.5 \times 10^{-5}$ mole/g or less.

2. A resin composition in accordance with claim 1, wherein the polyphenylene ether resins are present in an amount of 20 to 70 parts by weight and the polyamide resins are present in an amount of 30 to 80 parts by weight.

3. A resin composition in accordance with claim 1, wherein the polyamide resins of component (B)
    (a) comprise 3-20 weight percent, based on the total polyamide resins, of polyamide resins having a number-average molecular weight not greater than 11,000, and a terminal amino group content of at least $7.0 \times 10^{-5}$ mole/g, and
    (b) have an overall number-average molecular weight of 9,500 to 32,000, and a terminal amino group content of $5.5 \times 10^{-5}$ mole/g or less.

4. A resin composition in accordance with claim 1, wherein the polyamide resins of component (B)
    (a) comprise 1-50 weight percent, based on the total polyamide resins, of polyamide resins having a number-average molecular weight of 8,000 to 11,000, and a terminal amino group content of at least $7.0 \times 10^{-5}$ mole/g, and
    (b) have an overall number-average molecular weight of 9,500 to 32,000, and a terminal amino group content of $5.5 \times 10^{-5}$ mole/g or less.

5. A resin composition in accordance with claim 1, wherein the polyamide resins of component (B)
    (a) comprise 3-20 weight percent, based on the total polyamide resins, of polyamide resins having a number-average molecular weight of 8,000 to 11,000 and a terminal amino group content of at least $7.0 \times 10^{-5}$ g/mole, and
    (b) have an overall number-average molecular weight of 9,500 to 32,000, and a terminal amino group content of $5.5 \times 10^{-5}$ mole/g or less.

6. A resin composition in accordance with claim 1, wherein the polyamide resins of component (B)
    (a) comprise 3-20 weight percent, based on the total polyamide resins, of polyamide resins having a number-average molecular weight not greater than 11,000, and a terminal amino group content of at least $10 \times 10^{-5}$ g/mole, and
    (b) have an overall number-average molecular weight of 9,500 to 32,000, and a terminal amino group content of $5.5 \times 10^{-5}$ mole/g or less.

7. A resin composition in accordance with claim 1, wherein the polyamide resins of component (B)
    (a) comprise 1-50 weight percent, based on the total polyamide resins, of polyamide resins having a number-average molecular weight of 8,000 to 11,000, and a terminal amino group content of at least $10 \times 10^{-5}$ mole/g, and
    (b) have an overall number-average molecular weight of 9,500 to 32,000, and a terminal amino group content of $5.5 \times 10^{-5}$ mole/g or less.

8. A resin composition in accordance with claim 1, wherein the polyamide resins of Component (B)
    (a) comprise 3-20 weight percent, based on the total polyamide resins, of polyamide resins having a number-average molecular weight of 8,000 to 11,000 and a terminal amino group content of at least $10 \times 10^{-5}$ g/mole, and (b) have an overall number-average molecular weight of 9,500 to 32,000, and a terminal amino group content of $5.5 \times 10^{-5}$ mole/g or less.

9. A resin composition in accordance with claim 1 wherein the polyamide resins of Component (B)

(a) comprise 3-20 weight percent, based on the total polyamide resins, of polyamide resins having a number-average molecular weight not greater than 11,000, and a terminal amino group content of at least $7.0 \times 10^{-5}$ mole/g, and (b) have an overall number-average molecular weight of 11,000 to 25,000, and a terminal amino group content of $5.5 \times 10^{-5}$ mole/g or less.

10. A resin composition in accordance with claim 1, wherein the polyamide resins of component (B)

(a) comprise 1-50 weight percent, based on the total polyamide resins, of polyamide resins having a number-average molecular weight of 8,000 to 11,000, and a terminal amino group content of at least $7.0 \times 10^{-5}$ mole/g, and (b) have an overall number-average molecular weight of 11,000 to 25,000, and a terminal amino group content of $5.5 \times 10^{-5}$ mole/g or less.

11. A resin composition consisting essentially of:

(A) 5-80 parts by weight polyphenylene ether resins and (B) 20-95 parts by weight polyamide resins, wherein the polyamide resins of component (B)

(a) consist essentially of 3-20 weight percent, based on the total polyamide resins having a number-average molecular weight of 8,000 to 11,000, and a terminal amino group content of at least $10 \times 10^{-5}$ mole/g, and (b) have an overall number-average molecular weight of 11,000 to 25,000, and a terminal amino group content of $5.5 \times 10^{-5}$ mole/g or less.

* * * * *